United States Patent [19]

Maechtle et al.

[11] Patent Number: 4,909,657
[45] Date of Patent: Mar. 20, 1990

[54] STRADDLING DOWEL FOR ANCHORING IN A BORE HAVING AN UNDERCUT

[75] Inventors: Daniel Maechtle, Korntal; Guenter Valenta, Stuttgart, both of Fed. Rep. of Germany

[73] Assignee: Maechtle GmbH, Korntal-Munchingen, Fed. Rep. of Germany

[21] Appl. No.: 193,899

[22] Filed: May 13, 1988

[30] Foreign Application Priority Data

May 14, 1987 [EP] European Pat. Off. ........ 87106995.1

[51] Int. Cl.$^4$ ............................................. F16B 13/06
[52] U.S. Cl. ..................................... 403/290; 411/60; 403/297
[58] Field of Search .................. 403/297, 290, 248; 411/44, 70, 65, 41, 40, 60, 61, 64, 63, 66, 183, 173; 294/86.25, 94, 96

[56] References Cited

U.S. PATENT DOCUMENTS 4,702,656 10/1987 Kerrom ........................... 411/60

Primary Examiner—Randolph A. Reese
Assistant Examiner—Carol I. Bordas
Attorney, Agent, or Firm—Edwin T. Bean, Jr.; Martin G. Linihan; John C. Thompson

[57] ABSTRACT

Straddling dowel for anchoring in a bore having an undercut, comprising an expanding shell (10) having an axial bore (12, 14), which tapers gradually towards the front, for guiding a spreader (26) and having lamellae (28), which are formed by longitudinal slots in the front section of the expanding shell, have an undercut shoulder (20) at the front end and, on their outside, are tapered towards the front in the direction of the undercut shoulder. A guide tube (30) for a setting bolt (40) for driving forward the spreader (26) is used for connection to the rearward end of the expanding shell (10), the guide tube bearing an outer stop (36) and the setting bolt bearing an outer stop (42).

18 Claims, 1 Drawing Sheet

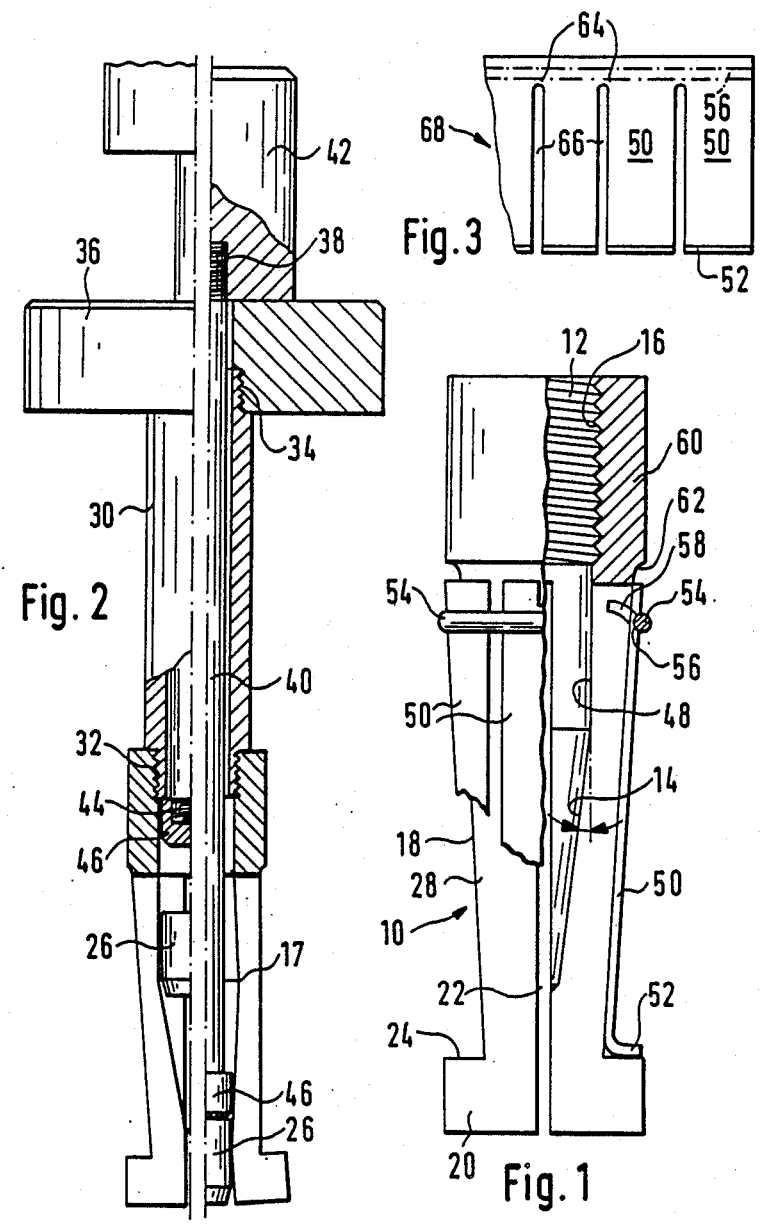

STRADDLING DOWEL FOR ANCHORING IN A BORE HAVING AN UNDERCUT

The invention relates to a straddling dowel for positive anchoring in a borehole which contains a radially widened undercut surface, comprising an expanding shell having a section which bears spreading lamellae and can be spread in the region of the undercut, and a spreader, which can be driven into an axial bore in the expanding shell, for expanding the spreadable portion.

In the case of a dowel of the above-mentioned type disclosed in DE No. 3,115,040, the expanding shell is screwed onto the forward end of a screw bolt inserted into the borehole, while the free ends of the spreading lamellae or spreading tabs connected in articulated fashion to the rearward end of the expanding shell point towards the mouth of the borehole. Behind the latter, a pointed spreader which is the shape of the shell and is prestressed against the spreading lamellae or into the annular slot formed between the spreading lamellae and the screw bolt by means of a compression spring supported on the workpiece and attempts to press itself into the annular slot, is guided on the screw bolt.

To prevent the loose spreading lamellae from being expanded by the spreader, which is under pretension, even before the dowel is introduced into the borehole, they are surrounded by a clamping element, e.g. by a metal ring or a plastic sleeve which, at the outer end, bears a projecting annular flange. When this annular flange commes into contact with the surface of the workpiece to be fixed or with the edge of the borehole and the dowel is pushed further into the borehole with increased force, the plastic sleeve comes off the spreading elements, which are then expanded by the spreader provided that they have space to do this or are situated in the borehole in the region of the under cut.

In this known straddling dowel, production and assembly are comparatively complicated. A further disadvantage is that, in setting, there is no guarantee that the expanding shell will penetrate down the borehole as far as the undercut, rather this region must be more or less felt as the dowel is pressed into the borehole, although this is difficult under the rough conditions on building sites, with the result that setting of the dowel in accordance with the undercut and hence the desired positive engagement is dependent on human skill and other external factors. Indeed, it is also possible for the dowel to be set too deep since the non-slotted front part of the expanding shell and the front portion of the screw bolt which receives it require an additional bore depth following the undercut.

Undercut dowels of a different design are also known (DE-OS No. 3,134,876) in which a metal shell at the forward end has spreading lamellae at the front, said spreading lamellae being defined by longitudinal slots and an annular groove. A bolt having an integrally formed spreading head extends through the shell, the circumference of the bolt increasing in conical fashion towards the front. In setting the preassembled dowel in a borehole provided at its base with an undercut, the shell is moved into the borehole by means of a nut screwed onto the rearward thread of the bolt and at the same time pushed onto the spreading head theoretically lying against the base of the borehole and expanded and the spreading head then pulls itself into the shell and the lamellae expand.

Such simple undercut dowels ean only be used successfully if the position of the undercut in the borehole is matched to the length of the shell. Where cracks in the concrete occur transverse or lengthwise to the dowel axis, it is to be feared, when such undercut dowels are used, that these will then receive play in the pull-out direction. Such play must be avoided at all costs, even if the borehole were to widen due to other events.

The object on which the invention is based is to develop a straddling dowel for positive anchoring in a bore-hole such that it can be set more simply than hitherto and in addition can be set in an undercut arranged at any desired distance from the base or from the entry of the borehole and at the same time guarantees assembly without the application of a spreading pressure and comparatively high pull-out values.

This object is achieved according to the invention by reason of the fact that the expanding shell contains a bore for guiding the cylindrical spreader, said bore tapering gradually in the direction of its front end, that the spreading lamellae at the front section of the expanding shell are formed by longitudinal slots and the front section has, in the vicinity of the front end, a generally radial shoulder and is conically tapered in the direction of the shoulder, and that a guide tube, which can be connected to the rearward end of the bore, contains a setting bolt for driving the spreader forward and bears a rearward, outer stop which bears against the entry of the borehole so as to fix the setting depth of the dowel.

The proposed design corresponds to a setbolt which is anchored by its head in concrete and whose free end protrudes from the masonry. Such tie rods embedded in concrete have optimum pull-out values and experience has shown that they are more likely to break off than to be pulled out of the anchoring. To anchor a setbolt retrospectively, an undercut, which can be produced by known undercutting tools at a desired depth in the borehole, is required in the wall bore. For various reasons, and also with regard to the simplicity of the undercutting tool, it is advantageous if the undercut is produced directly above the base of the borehole.

The straddling dowel according to the invention is capable either of engaging by its, preferably, radial shoulder in an undercut located either directly above the base of the borehole or alternatively at another depth in the borehole. This straddling dowel makes possible defined, exact setting with respect to a known undercut depth by means of the associated setting tool.

In addition to a particularly simple construction, the setting tool has the advantage that it can be used again and again. After the introduction of the dowel, the outer stop of the setting tube comes to lie, by reason of the defined length of the setting tube, against the wall of the entry of the borehole or, in the case of push-through assembly, against the upper side of the workpiece to be fixed, while the radially widened shoulder of the expanding shell is exactly aligned with the undercut. When the setting bolt is driven in, the spreading shoulders thereby coincide exactly with the undercut. When, after the spreader has been driven in, the head of the setting bolt bears against the rear side of the setting tube or against a stop attached at that point, the spreading operation is so far advanced that the spreading lamellae have reached their radially expanded end position with maximum anchoring.

According to a fundamental inventive idea which develops the straddling dowel further but can also be advantageously employed independently thereof in the case of undercut dowels of different design, cover plates can be provided on the periphery of the expandable section of the expanding shell, said cover plates being connected to one another, in a manner allowing movement, in the region of their end opposite the expansion, in each case being arranged over a longitudinal slot in the expanding shell and being of a width such that the longitudinal slot remains covered even after spreading.

By means of this proposal, which can be applied in the case of undercut dowels of various different types, the front faces and/or the edges of the expanded lamellae or segments of a dowel are prevented from compacting the masonry excessively or burrowing in there; furthermore, this design guarantees the desired slip-free anchoring. Although, in the more or less expanded condition of the lamellae, the surface pressure exerted by the lamellae or segments during the transmission of force into the masonry theoretically remains the same, account must be taken of the fact that, after expansion, individual, widely spaced lamella sections bear against the masonry and, as divided surfaces, burrow in there more easily only because their surface edges have a cutting action which contributes to this effect. Based on the knowledge of these unfavorable processes, a requirement for the installation of undercut dowels is that the expanding shell should be tightened with a particularly high pretensioning moment when, or before, the workpiece is fixed thereto.

A grave problem is completely removed in a surprisingly simple manner using cover plates since the edges of the lamellae and protruding segments decisive for burrowing into the masonry have vitrually disappeared by reason of the cover plates. In this arrangement, the cover plates have the effect of holding together any ground-up masonry which may be present and of preventing small ground particles from escaping through the longitudinal slots or opened-out interstices between the lamellae, thereby giving rise to room for small ground particles displaced by further burrowing to escape.

The cover plates are advantageously approximately matched to the curvature of the expanding shell and are arranged in a recess set back radially with respect to the periphery of the shell such that, in the unexpanded condition, they remain within the clear outside diameter of the straddling dowel, which can then easily be introduced into the wall bore, which has been made slightly oversized.

The cover plates can be aligned with respect to the particular longitudinal slot by in each case at least one projection, which is made centrally at the ends facing away from the region of the expansion, protrudes radially inwards and in each case engages in a longitudinal slot in the expanding shell. Since the projection is confined to a region of the longitudinal slot which is delimited by relatively closely set side walls even after the dowel has been expanded, the cover plate continues to be guided and the longitudinal slot is covered even in the expanded condition.

At the expandable end of the expanding shell, each cover plate can have at least one section which has been bent round and keeps the longitudinal slot closed even after spreading. Especially in the case of a dowel having a radial undercut shoulder, the bent-round or independent section ensures that the shoulder bears against the undercut in the borehole with specific surface pressure like a coherent surface.

The cover plates can be so wide that they lie laterally next to one another on the periphery of the expanding shell when the dowel is not spread, and they have interconnected sections which are directed both axially and also approximately radially. Where the cover plates are not individual parts and held together by means of a spring washer, they can consist of stamped metal blanks bent together to form sleeves or can also consist of another material, in particular plastic having increased hardness or toughness values. In the region of the end facing away from the spreading, the cover plates can be connected together and held in contact with the periphery of the spreading lamellae by a spring washer.

In a preferred embodiment, the recess extending over the periphery of the expanding shell so as to accommodate the cover plates can be formed by an annular shoulder of the expanding shell which divides a larger-diameter cylindrical section of the expanding shell from the expandable section which forms the recess and tapers towards the front.

Although it is favorable in terms of cost to produce the expanding shell by die-casting, costs for an expanding shell produced as a turned and milled part remain low if, because of the high pull-out forces and safety levels required, forged steel is used. It can be particularly expedient when the undercut shoulder has the same diameter as the cylindrical section of the expanding shell in the unexpanded condition of the expanding shell.

At the front, the guide tube can have a threaded section by which it can be screwed into an internal thread of the expanding shell. The stop at the rearward end of the guide tube can comprise a stop plate, which serves as a stop both with respect to the wall containing the borehole and also with respect to the rearward head of the setting bolt. Because of the defined length of the guide tube, the front shoulder of the expanding shell screwed to the front end of the tube is situated exactly at the depth of the undercut so that, when the setting bolt is driven in, the undercut shoulders of the expanded lamellae pass reliably into the undercut of the bore. When, after the driving in of the spreader, the setting bolt rests on the stop plate of the guide tube, the spreader has pressed the lamellae into their expanded end position in which optimum anchoring is achieved by means of the anchoring bolt which is subsequently screwed into the expanding shell in place of the guide tube.

Further features and advantages emerge from the following description of exemplary embodiments of the invention and from the drawings. The individual features of the claims can be implemented individually or severally in any desired combination, even with different embodiments of the invention. In schematic form, FIG. 1 shows an enlarged partial longitudinal section through an expanding shell according to the invention, FIG. 2 shows a longitudinal section through a straddling dowel with the setting tool according to the invention, the individual parts to the right of the center line being drawn in the set condition, and FIG. 3 shows a schematic view of a sheet metal blank stamped in accordance with a development of a plurality of cover plates.

According to FIGS. 1 and 2, the expanding shell 10 of an undercut dowel in accordance with the invention consists of a one-part metal body which comprises a rearward cylindrical shell section 60 and an adjoining shell section 18 which tapers towards the front, in the exemplary embodiment shown the latter being two to three times longer than the rearward cylindrical section 60. The expanding shell contains a cylindrical bore 12, which corresponds to approximately half the length of the expanding shell, and, adjoining towards the front, a bore section 14 which tapers with a cone angle of about 7° and, in the example, does not extend to the front end of the expanding shell for production reasons.

Approximately over the length of the tapered shell section 18, the expanding shell contains longitudinal slots 22, thereby producing, depending on the number of slots, at least four, optionally even more, identical, flexible lamellae 28 in order to expand the expanding shell. At the front end, the tapered shell section 18 merges into a widened cylindrical part, which serves as an undercut shoulder 20 and whose rear side 24 comes to lie against an undercut surface of corresponding radial extension in a wall bore. At its front end, i.e. that end which is first to enter the bore, each lamella 28 thus bears what is, in plan view, a segment-shaped undercut shoulder 20.

The wall thickness of the lamellae 28 is a product of the conical outer periphery of the tapered shell section 18 and the diameter of the cylindrical bore 12 and the cone angle of the conical bore section 14 adjoining the latter and is dimensioned such that the smallest cross-section remaining complies with the pull-out values required of the dowel. It can be seen from FIG. 1 that the lamellae 28 have the smallest cross-section in the vicinity of their rearward end, approximately at location 17, with the result that, during the spreading operation, the lamellae preferentially begin to bend around this region.

The rearward end of the cylindrical bore 12 of the expanding shell contains an internal thread 16 into which, according to FIG. 2, an external thread 32 arranged on the reduced front end of a guide tube 30 is screwed. The guide tube 30 has a certain length and at its rearward thread section 34 is screwed to a stop plate 36 which is brought into contact with the outer wall of the masonry containing the entry of the bore during the setting of the dowel so that the undercut shoulders on the lamellae of the expanding shell penetrate to the same depth as the undercut in the wall bore.

The setting tool of the straddling dowel is completed by a setting bolt 40, which is introduced into the guide tube and to the front end 44 of which a, preferably exchangeable impact cap 46 is attached, for exaple by a thread. The setting bolt and its impact cap act against a cylindrical spreader 26 which is introduced through the cylindrical bore 12 and, when driven forward, bends the lamellae 28 outwards. At the rearward end, the setting bolt bears a setting bolt head 42, which is screwed on. The setting bolt length is such that, when the setting bolt head 42 is resting on the rear side of the stop plate 36, the expanding shell is in its completely expanded condition.

This condition, which, in FIG. 2, is illustrated to the right of the center line, shows the spreader 26 at the front end of the expanding shell 10, where it is clamped in by virtue of the frictonal engagement with the lamellae 28, additionally rests against the base of the bore or is secured at a more remote bore base against falling out by a possible forward extension pin (not shown). The lamellae 28 are expanded to such an extent that the shape, which originally tapered conically towards the front, is approximately cylindrically and possibly (sic) expanded until contact is established against the bore wall. In this set, expanded condition of the straddling dowel, the guide tube 30 is unscrewed, it being possible for the assembler to grip the stop plate 36, which is, for example, provided with a peripheral knurl, directly for this purpose. Together with the component to be fixed to the wall, an anchoring bolt can now be screwed into the set dowel and braced against the wall.

An effective improvement of the positive anchoring of undercut straddling dowels is achieved according to the invention by the cover plates 50 which are in part shown broken up and in part in section in FIG. 1, correspond approximately to the length of the lamellae and are preferably so wide that they cover the particular longitudinal slot 22 even in the spread condition. In their simplest form according to FIG. 1, the cover plates 50 can comprise pieces of sheet metal which initially rest by a straight section against the lamellae 28 and, at the front end, bear a bent-over section 52 which covers the longitudinal slot in the region of the undercut shoulder 24. They are matched approximately to the curvature of the expanding shell and are arranged in such a manner in the recess, which is set back radially with respect to the periphery of the cylindrical shell section 60, that they do not protrude beyond the clear outside diameter of the straddling dowel.

At the rearward end, each cover plate 50 is provided with a projection 58, which is stamped out and bent over, engages in the longitudinal slot 22 of the expanding shell and thus keeps the cover plate aligned with respect to the longitudinal slot. In the case of cover plates of a suitable plastic, the projections 58 can consist of pins which have been molded in or screwed in. At the rearward end, the cover plates 50 are connected together by a spring washer 54 which is accommodated in the form of a metal or plastic ring in a peripheral groove 56, which has been pressed in or carved out, in order to hold the cover plates 50 together as a group.

FIG. 3 shows similar cover plates to those in FIG. 1 and these have been produced as a coherent stamped part in which individual cover plates 50 are separated from one another by slots 66 which have been stamped out but are connected via a rearward connecting web 64. In this case too, a spring washer can additionally be provided as before, in order to hold the blank 68, which has been bent into the shape of the shell, in contact with the expanding shell 10.

We claim:

1. A straddling dowel for positive anchoring in a borehole which contains a conical to approximately radially widened undercut surface, comprising an expanding shell having a section which bears spreading lamellae and can be expanded in the region of the undercut, and a spreader for driving in axially into the expandable section of the expanding shell, wherein the expanding shell (10) contains a bore (12, 14), having a gradual taper at the front end, for guiding the cylindrical spreader (26), wherein longitudinal slots (22) which form spreading lamellae (28) are provided at the front section of the expanding shell, wherein the expanding shell has, in the vicinity of the front end, a generally radial undercut shoulder (20) and, on its outside, is conically tapered towards the front in the direction of the undercut shoulder, and wherein a guide tube (30), which can be connected to the rearward end of the bore (12), contains a setting bolt (40) for driving the spreader (26) forward and bears a rearward, outer stop (36)

which bears against the entry of the borehole so as to fix the setting depth of the expanding shell, and wherein cover plates (50) are provided on the periphery of the expandable section of the expanding shell (10), said cover plates being connected to one another, in a manner allowing movement, in the region of their end opposite the expansion and in each case being arranged over a longitudinal slot (22) in the expanding shell and being of a width such that the longitudinal slot is still covered essentially over its entire width even after expansion.

2. A straddling dowel as claimed in claim 1, wherein the cover plates (50) are approximately matched to the curvature of the expanding shell and are arranged in a recess set back radially with respect to the periphery of the shell such that, in the unexpanded condition, they remain within the clear outside diameter of the straddling dowel.

3. A straddling dowel as claimed in claim 1, wherein the cover plates (50) are aligned with respect to the particular longitudinal slot by in each case at least one projection (58), which is centrally located at the ends facing away from the region of the expansion, and wherein the projection protrudes radially inwards and in each case engages a longitudinal slot (22) in the expanding shell (10).

4. A straddling dowel as claimed in claim 1, wherein, at the expandable end of the expanding shell, each cover plate (50) has at least one lug (52), in particular bent round at right angles, which keeps the longitudinal slot (22) in that region of the lamellae which adjoins the usually axially extending shell periphery closed with respect to the masonry.

5. A straddling dowel as claimed in claim 1, wherein the cover plates (50) are arranged laterally abutting on the periphery of the expanding shell and have sections (50, 52), in particular connected sections, which extend both in the axial direction and also approximately in the radial direction.

6. A straddling dowel as claimed in claim 1, wherein the cover plates (50) consists of sheet metal.

7. A straddling dowel as claimed in claim 6 wherein the sheet metal cover plates (50) are formed of metallic stamped parts.

8. A straddling dowel as claimed in claim 1 wherein, in the region of the end facing away from the expansion, the cover plates (50) are connected together and held in contact with the periphery of the spreading lamellae (28) by a spring washer (54).

9. A straddling dowel as claimed in claim 1, wherein the cover plates (50) are additionally conencted together via a rearward connecting web (64) at their ends facing away from the expansion.

10. A straddling dowel as claimed in and claim 1, wherein the recess extending over the periphery of the expanding shell (10) so as to accommodate the cover plates (50) is formed by an annular shoulder (62) of the expanding shell which divides a larger-diameter cylindrical section (60) of the expanding shell from the expandable section (18) which forms the recess and tapers towards the front.

11. A straddling dowel as claimed in claim 10 wherein, in the unexpanded condition of the expanding shell, the radial undercut shoulder (20) has in general the same diameter as the cylindrical section (60) of the expanding shell.

12. A straddling dowel as claimed in claim 10, wherein the expandable front section (18) which contains the longitudinal slots (22) has a greater length than the rearward cylindrical section (60).

13. A straddling dowel as claimed in claim 1 wherein the cover plates (50) consist of tough plastic.

14. A straddling dowel for positive anchoring in a borehole which contains an approximately radially widened undercut surface; comprising:
an expanding shell (10) having a front section including longitudinal slots (22) to form spreading lamellae (28), which can be expanded in the region of the undercut, the shell containing a bore (12, 14) having a gradual taper at the front end thereof, and a generally radial undercut shoulder (20) near the front end of said expanding shell;
a spreader (26) in said bore for being driving in axially in to the expandable section of said expanding shell;
a guide tube (30) connected to the rear end of the expanding shell in coaxial alignment with said bore;
a setting bolt (40) contained in said tube for being guided therein to drive said spreader forward; and
an outer stop (36) at the rear end of said guide tube bearing against the entry of the borehole so as to fix the setting depth of the expanding shell.

15. A straddling dowel as claimed in claim 1 or 14, wherein the bore of the expanding shell (10) has a rearward cylindrical section (12) extending over approximately half the length of the shell and, starting from said section, a section (14) which tapers conically towards the front.

16. A straddling dowel as claimed in claim 1 or 14, wherein, at the forward end, the guide tube (30) has a threaded section (32) by which it can be screwed into an internal thread on the rearward end of the bore (12) of the expanding shell (14).

17. A straddling dowel as claimed in claim 1 or 14, wherein the stop at the rearward end of the guide tube (30) comprises a stop plate (36) which can be screwed onto a rearward threaded section (34) of said guide tube and serves as a stop both with respect to the wall containing the borehole and with respect to the rearward (42) of the setting bolt (40).

18. A straddling dowel as claimed in 1 or 14 wherein the setting bolt bears a releasable, exchangeable impact cap (46) at the front end.

* * * * *